United States Patent
Hargrove et al.

(10) Patent No.: US 9,156,745 B2
(45) Date of Patent: Oct. 13, 2015

(54) FERTILIZER GRANULES HAVING POLYMERIC COATING WITH ORGANIC CARBONATE

(71) Applicant: Agrium Advanced Technologies (U.S.) Inc., Loveland, CO (US)

(72) Inventors: Garrard L. Hargrove, Birmingham, AL (US); Sriramakrishna Maruvada, Birmingham, AL (US)

(73) Assignee: Koch Agronomic Services, LLC, Wichita, KS (US)

( * ) Notice: Subject to any disclaimer, the term of this patent is extended or adjusted under 35 U.S.C. 154(b) by 0 days.

(21) Appl. No.: 14/265,894

(22) Filed: Apr. 30, 2014

(65) Prior Publication Data

US 2014/0331727 A1    Nov. 13, 2014

Related U.S. Application Data

(60) Provisional application No. 61/820,426, filed on May 7, 2013.

(51) Int. Cl.
*C05C 9/00* (2006.01)
*C05G 3/00* (2006.01)
*C08G 18/09* (2006.01)

(52) U.S. Cl.
CPC .............. *C05G 3/0029* (2013.01); *C05C 9/005* (2013.01); *C05G 3/0035* (2013.01); *C08G 18/095* (2013.01)

(58) Field of Classification Search
None
See application file for complete search history.

(56) References Cited

U.S. PATENT DOCUMENTS

| | | | |
|---|---|---|---|
| 4,454,259 A * | 6/1984 | Reischl et al. ................ | 523/129 |
| 4,804,403 A | 2/1989 | Moore | |
| 5,538,531 A * | 7/1996 | Hudson et al. .................... | 71/28 |
| 6,176,891 B1 | 1/2001 | Komoriya et al. | |
| 6,358,296 B1 | 3/2002 | Markusch et al. | |
| 6,364,925 B1 | 4/2002 | Markusch et al. | |
| 6,540,808 B2 * | 4/2003 | Ma et al. ........................... | 71/27 |
| 2008/0134738 A1 * | 6/2008 | Roberts et al. .................... | 71/30 |
| 2012/0111076 A1 | 5/2012 | Avdala et al. | |
| 2012/0111077 A1 | 5/2012 | Maruvada et al. | |

* cited by examiner

*Primary Examiner* — Wayne Langel (57) ABSTRACT

A controlled release fertilizer composition and methods to produce the controlled release fertilizer composition. The controlled release fertilizer composition includes a fertilizer core that is coated with a polymeric layer, such as polyurethane, that includes an organic carbonate additive.

22 Claims, 4 Drawing Sheets

FERTILIZER GRANULES HAVING POLYMERIC COATING WITH ORGANIC CARBONATE

FIELD OF THE DISCLOSURE

This invention relates to controlled release fertilizer compositions. Particularly, the invention relates to controlled release fertilizers having a core coated with a polymeric layer.

BACKGROUND

Fertilizers have been used for many years to supplement plant nutrients in soil or other growing media. In recent years the art has focused on techniques to deliver controlled amounts of plant nutrients to the soil or other growing media. It is recognized, for example, that controlling the release of plant nutrients such as nitrogen from highly soluble fertilizer granules is desirable because releasing the nutrients over an extended period of time achieves advantages which include increased efficiency of fertilizer use by plants, reduced application costs since fewer applications of fertilizer are required and reduced nutrient loss caused by leaching and denitrification. Applying a coating on the surface of the fertilizer granules may reduce the dissolution rate of the granules and impart controlled-release characteristics. In essence, the water in the soil and rainwater are kept away from the very soluble fertilizer until a granule develops a flaw such as a crack or fissure in the coating or the coating develops porosity upon exposure to water.

In some applications, a sulfur coating is applied to fertilizer granules. Due to the inherent brittleness of the crystalline solid sulfur-coating and the thin, or even non-continuous, coating on many of the granules, it is typical to apply some type of secondary outer coating or sealant onto the sulfur-coated surface. This sealant conventionally is either a polymeric hydrocarbon, petroleum-based wax, or a combination of high viscosity polymeric paraffinic oil plus polyethylene, which is spray-applied as a hot melt liquid onto the hot, but solidified sulfur-coating surface.

Although these sulfur coated fertilizers have received substantial uses, there are problems from the standpoint of obtaining uniform coating thicknesses, obtaining predictable release characteristics, abrasion and impact resistance, and the complexity of the coating process steps. Because of these problems associated with sulfur coated fertilizers, polymer coated fertilizers have received substantial attention, particularly in view of the improved controlled release properties obtained with certain polymer coated fertilizers at lower coat weights. The polymer coated fertilizers may have multiple coating layers. Examples of polymeric fertilizer coatings include: an inner coating of a urethane reaction product derived from reacting isocyanate and polyol, with an outer coating of an organic wax; an oleo polyol(s) coating; a polyurea coating formed by applying an isocyanate-reactive component containing at least two amine groups and subsequently applying a polyisocyanate.

Various polymeric yet sulfur containing coatings are also known. Examples of such coatings include: sulfur containing isocyanate coatings prepared by applying a mixture of sulfur and an isocyanate to the fertilizer and then applying an isocyanate-reactive material; a coating formed by applying a sulfur coating and subsequently applying a polymer coating over the sulfur; a thermosetting resin coating such as urethane and a hydrophobic compound (e.g., wax); a multilayer coating comprising a polyurethane layer and a wax layer; and a multilayer coating comprising a polymer layer, a sulfur layer, and another polymer layer.

Other coatings are also known. For example, a fertilizer core can be coated with organic oil and particles to improve the release profiles of the fertilizer.

SUMMARY OF THE INVENTION

Polymer coated fertilizers as described above have received substantial attention, but they are expensive to manufacture. There is a need to provide lower-cost controlled release fertilizer formulations that are abrasion resistant.

The present disclosure provides abrasion resistant, controlled release fertilizer particles, the particles having a polyurethane coating comprising a cyclic organic carbonate. The coating is particularly suited for increasing the abrasion resistance on non-spherical fertilizer core particles and fertilizer core particles having an irregular and/or non-smooth surface, such as cores that are crushed or crumbled or are otherwise irregular. The coated fertilizer composition, with an undamaged coating (e.g., unabraded), has a release in water of no more than 90% after 3 days at 40° C. (104° F.).

In one particular embodiment, this disclosure provides a controlled release fertilizer composition comprising a plant nutrient core having an outer surface, and a polymeric coating on the outer surface, the polymeric coating comprising a cyclic organic carbonate at a level of no more than 25 wt-% of the polymeric coating.

In another particular embodiment, this disclosure provides a controlled release fertilizer composition comprising a plant nutrient core having an outer surface, and a polymeric coating on the outer surface, the polymeric coating comprising a cyclic organic carbonate at a level of no more than 5 wt-% of the fertilizer composition, in some embodiments no more than 4 wt-%.

In yet another particular embodiment, this disclosure provides a controlled release fertilizer composition comprising a plant nutrient core having an irregular shape and a non-smooth outer surface, and a polymeric coating on the outer surface, the polymeric coating comprising a cyclic organic carbonate at a level of no more than 1.5 wt-% of the fertilizer composition.

In yet another particular embodiment, this disclosure provides a process of using a controlled release fertilizer composition. The process includes providing a controlled release fertilizer having a plant nutrient core coated with a polymeric coating comprising a cyclic organic carbonate, either applying the controlled release fertilizer to a surface or incorporating the controlled release fertilizer into a growing medium, exposing the applied or incorporated fertilizer to moisture, and releasing no more than 90% of the applied controlled release fertilizer in 3 days at 40° C. (104° F.).

The cyclic organic carbonate may be any of propylene carbonate, ethylene carbonate, glycerol carbonate, 1,2-butylene carbonate, cis 2,3-butylene carbonate, trans 2,3-butylene carbonate, and phenylethylene carbonate. Further, the cyclic organic carbonate can be present at a level of no more than 25 wt-% of the polymeric coating, or no more than 20 wt-% of the polymeric coating, such as between 3 wt-% and 18 wt-% of the polymeric coating or between 5 wt-% and 16 wt-% of the polymeric coating. Additionally or alternately, the cyclic organic carbonate can be present at a level of no more than 4 wt-% or 2 wt-% of the fertilizer composition.

The polymeric coating on the core may be a polyurethane that is a reaction product of a polyol and an isocyanate. The polyol used can be a polyester polyol or a polyether polyol, castor oil, a vegetable oil such as soybean oil, canola oil, linseed oil, or sunflower oil that has been modified to contain isocyanate reactive hydroxyl or amine groups, or a nut oil, such as tung oil, that has been modified to contain isocyanate reactive hydroxyl or amine groups. If the polymeric coating is a polyurethane, the cyclic organic carbonate may be present in the polyol, the isocyanate, or both.

The plant nutrient core typically has either or both an irregular shape and a non-smooth outer surface. The plant nutrient core may be potassium chloride (also referred to as muriate of potash, or MOP), compacted potassium sulfate ($K_2SO_4$) (also referred to as sulfate of potash, or SOP), monoammonium phosphate (MAP), compacted ferrous sulfate ($FeSO_4$), aluminum sulfate, homogenous NPK (all in one) granule, NPK+micronutrients granule, or urea.

In yet another particular embodiment, this disclosure provides a controlled release fertilizer composition comprising a potassium chloride plant nutrient core and a polymeric coating comprising a cyclic organic carbonate surrounding the core.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawing, in which.

DETAILED DESCRIPTION OF THE INVENTION

The present invention relates to a controlled release fertilizer composition comprising a particulate fertilizer or plant nutrient surrounded by a polymeric coating that includes an organic carbonate.

Figure 1:
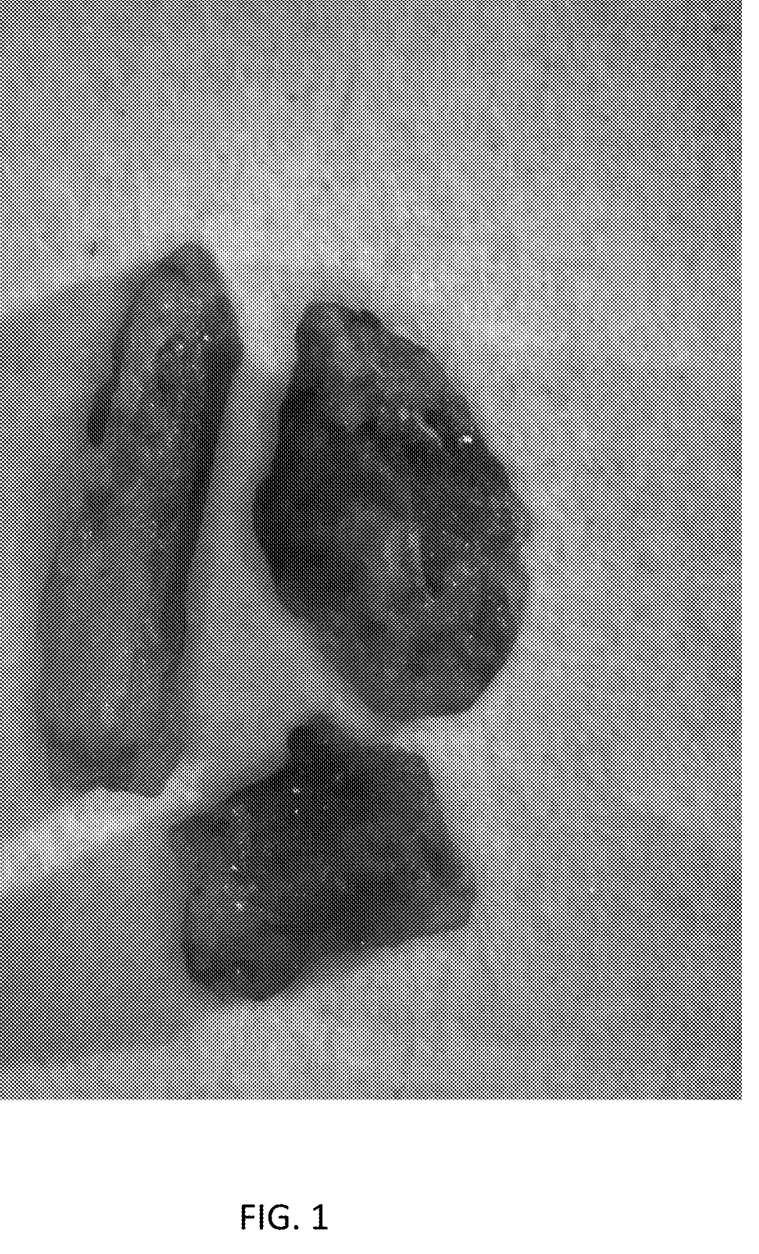
FIG. 1 is a photograph of compacted muriate of potash (MOP) at 50× magnification.
Figure 2:
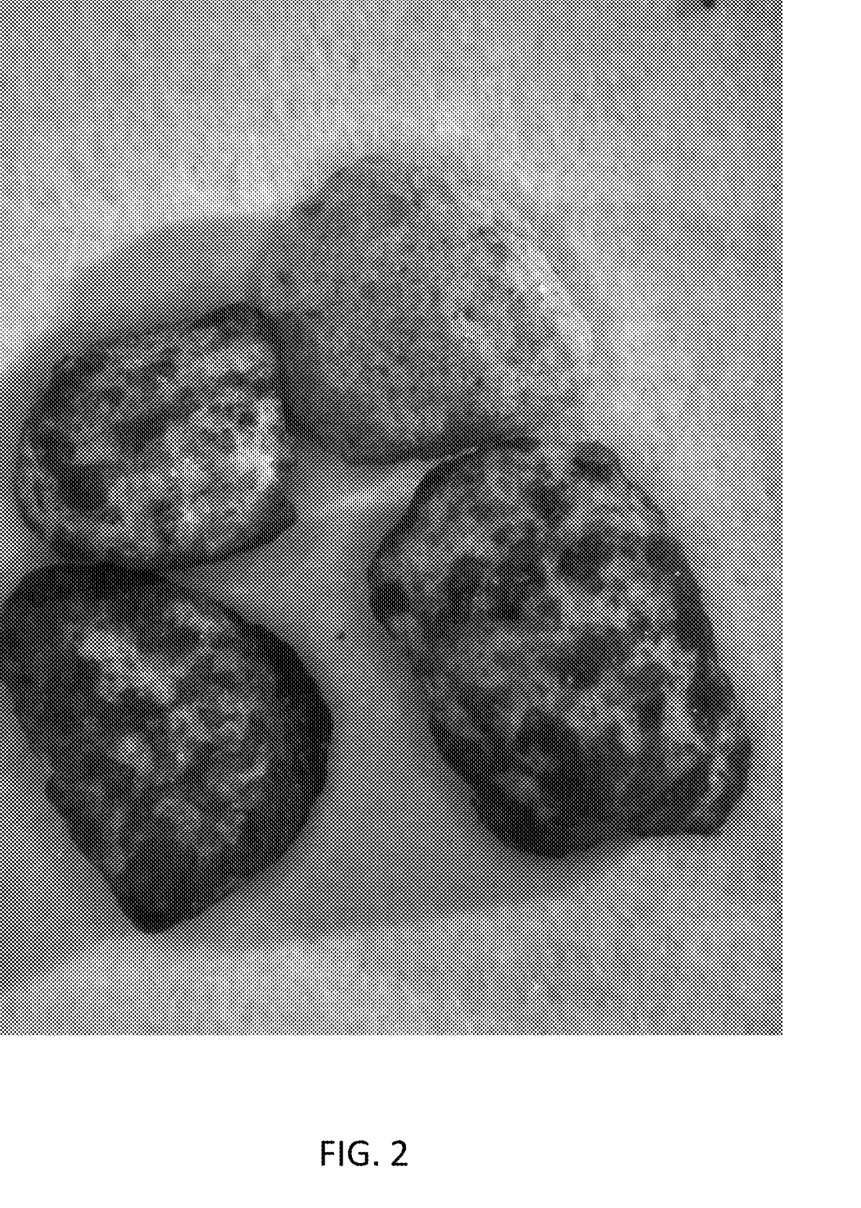
FIG. 2 is a photograph of compacted sulfate of potash (SOP) at 50× magnification.
Figure 3:
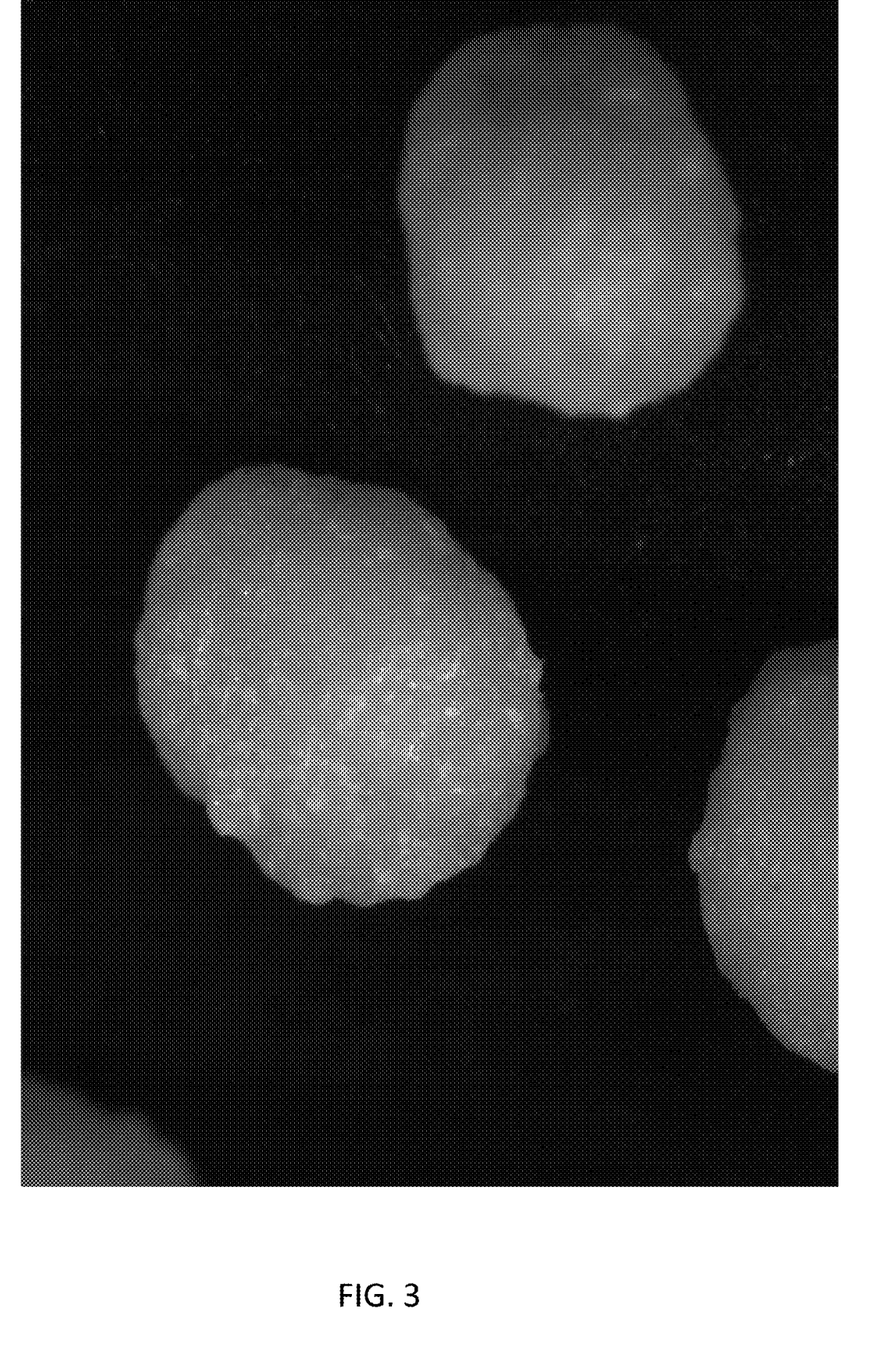
FIG. 3 is a photograph of drum granulated NPK at 50× magnification.
Figure 4:
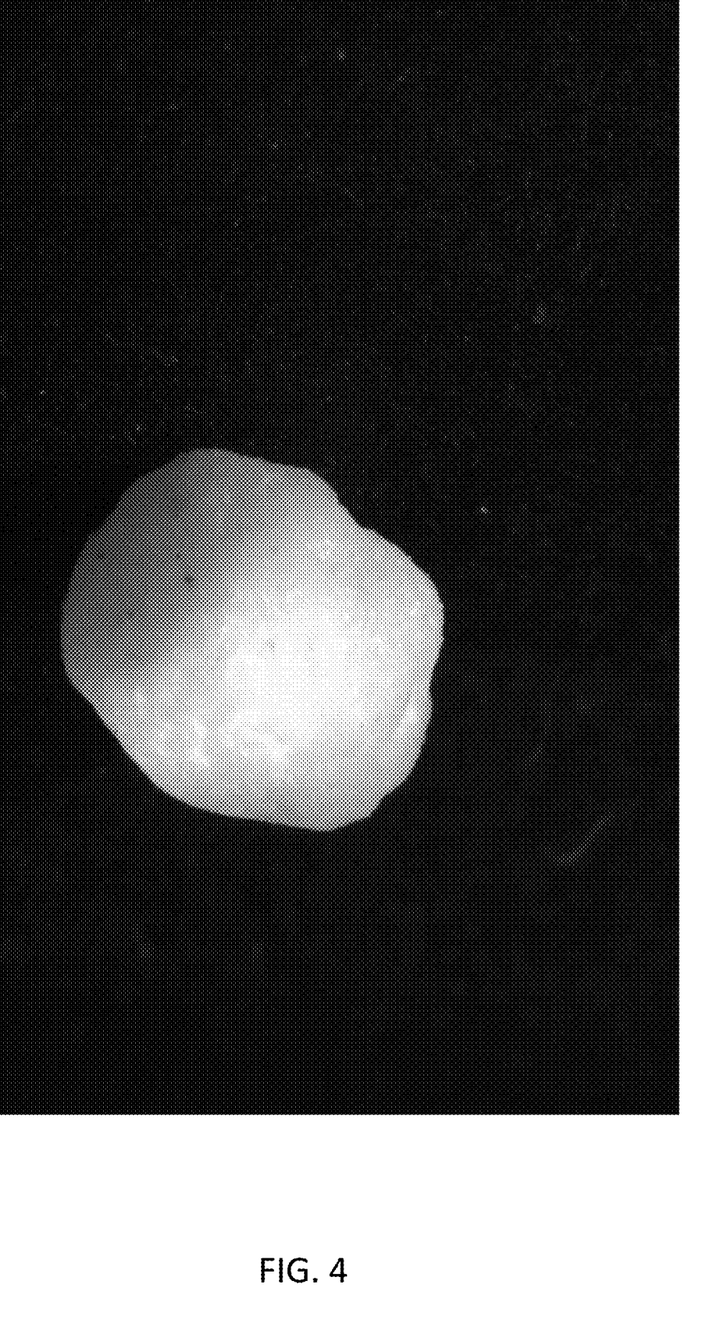
FIG. 4 is a photograph of fluid bed granulated urea at 50× magnification.

The choice of particulate plant nutrient or fertilizer useful for the present controlled release fertilizer composition is not to be restricted, however, it has been found that the coating of this invention is particularly beneficial for irregular shaped and/or irregular surfaced fertilizer core granules. Examples of non-spherical, rough surfaced fertilizer cores include compacted potassium chloride (also referred to as muriate of potash, or MOP), compacted potassium sulfate ($K_2SO_4$) (also referred to as sulfate of potash, or SOP), monoammonium phosphate (MAP), compacted ferrous sulfate ($FeSO_4$), aluminum sulfate, NPK (all in one) granules, NPK+micronutrients granules, and urea granules. FIGS. 1 through 4 show several granules of muriate of potash (MOP), sulfate of potash (SOP), drum granulated NPK, and fluid bed granulated urea, respectively, all at 50× magnification; from these photographs, the non-spherical and/or rough surface of the granules can be readily seen. The granules or cores may be made by, for example, a falling curtain drum granulation process, fluid bed granulation process, compaction process, prilling tower process, or pan granulation process, all which are known to persons skilled in the relevant field. Throughout this disclosure, the fertilizer material is described primarily with reference to potassium chloride (MOP) as the plant nutrient; as will be apparent to one skilled in the art, however, other nutrients, including micronutrients, can be provided with the abrasion-resistant coating to prepare the controlled release fertilizer compositions in accordance with the present invention.

The amount of nutrients present within the controlled release fertilizer composition as describe herein may vary as follows, where the listed amounts are weight percentages (wt. %) based on the weight of the fertilizer composition:

Nitrogen derivatives (as nitrogen): 0 wt. %-45.54 wt. %
Phosphorus derivatives (as $P_2O_5$): 0 wt. %-51.48 wt. %
Potassium derivatives (as $K_2O$): 0 wt. %-61.38 wt. %
Iron Sulfate: 0 wt. %-99 wt. %
Iron EDTA chelate: 0 wt. %-99 wt. %
Copper Sulfate: 0 wt. %-99 wt. %
Manganese Sulfate: 0 wt. %-99 wt. %
Zinc Sulfate: 0 wt. %-99 wt. %
Sodium Molybdate: 0 wt. %-99 wt. %
Sodium Borate: 0 wt. %-99 wt. %, and/or
Magnesium Sulfate: 0 wt. %-99 wt. %.

The particulate plant nutrient material, or fertilizer core, of the controlled release fertilizer composition of the present invention is coated with a polymeric coating. Examples of suitable polymeric coatings include polyurethane or coatings comprising polyesters such as alkyd or a modified alkyd resin, epoxy resins, aminoplastic resins, ureaformaldehyde thermosets, melamine-formaldehyde thermosets, phenolic thermosets, polyimide thermosets, unsaturated polyester thermosets, and mixtures thereof. The polymeric coating can be a thermosetting polymeric coating. The polymeric coating may be formed by multiple layers, and in some embodiments, the coating has at least three layers, in other embodiments at least four layers.

As indicated above, the polymeric coating on the controlled release fertilizer core may be a polyurethane; this coating may be produced using two or more than two precursor compounds. For example, one of the precursor compounds may be an isocyanate, such as a diisocyanate or a polyisocyanate. A non-limiting example of a suitable diisocyanate is polymeric MDI (4,4 diphenylmethane diisocyanate). Other poly-functional isocyanates can be used, as described in U.S. Pat. No. 4,804,403 (Moore; see for example Column 8, line 64 to Column 9, line 2 and Example 1; which is incorporated herein by reference), and include aliphatic, aromatic, and aliphatic aromatic polyisocyanates. Isocyanates contain two or more —NCO groups available for reaction and, as known to one skilled in the art, are widely used in the production of urethane polymers. Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethanie diisocyanate, 4,4'-diphenylpropane diisocyanate, 4,4'-diphenyl-3, 3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenl)methane, bis-(3-methyl-4-isocyanatophenyl)methane, polymethylene polyphenyl polyisocyanates and mixtures thereof.

The second of the two or more than two precursor compounds used to form a polyurethane polymeric coating may include a polyol, for example, as described in U.S. Pat. No. 4,804,403 (Moore; see for example, Column 9, lines 3-20, and Example 1). Non limiting examples of polyols include diethylene glycol polyol, ethylene glycol, polypropylene glycol, organic polyols, orthophathalate diethylene glycol based polyester polyols, terephthalate-diethylene glycol based polyester polyols, castor oil and oils modified to contain amine or OH groups, for example modified tung oil, vegetable oils such as soybean oil, canola oil, sunflower oil, linseed oil, (see, for example, U.S. Pat. No. 6,364,925 (Markusch et al.), see for example Column 8, line 39 to Column 9, line 27 and the examples; and U.S. Pat. No. 6,358,296 (Markusch et al.), see for example Column 9, lines 1 to 13, and the examples; which are incorporated herein by reference), oleo-polyols, for example epoxidized castor oil, epoxidized sunflower oil, epoxidized linseed oil as described in U.S. Pat. No. 6,358,296 (Markusch et al.), polyether polyols, castor oil derivatives for example partial hydrolysates of castor oil, formed by reacting castor oil with a polyol selected from diols (e.g. ethylene glycol, propylene glycol, 1,4-butanediol, neopentyl glycol, 1,6-hexanediol, diethylene glycol, dipropylene glycol, polyethylene glycol, and polypropylene glycol), glycerol, trimethylolpropane, and polyether polyol, or esters formed by reactions between ricinoleic acid and the polyol selected from the compounds as described in U.S. Pat. No. 6,176,891 (Komoriya et al.; see for example Column 7, lines 4 to 16, Column 8, lines 49 to 62; which is incorporated herein by reference), or any combinations thereof. Cross linked glyceride mixtures, mono- and di-glyceride mixtures that are not cross linked, and other cross linked polyols can also be used to form a polyurethane polymeric coating (see for example, U.S. applications having Ser. Nos. 13/291,681 and 13/291,698, all filed Nov. 8, 2011 and all which are incorporated herein by reference).

Although a polyurethane polymer coating is preferred, it is not required that the polymer coating as used herein be based on an isocyanate or polyol. The polymer can be virtually any polymer that can be applied to the plant nutrient and can provide a controlled release characteristic, or a portion of the controlled release characteristic to the fertilizer composition.

The polymer coating that surrounds the plant nutrient core is present in an amount in the range of from about 0.5% to about 20% by weight, or any amount therebetween, of the final fertilizer composition. For example, the polymeric coating may be from about 0.5% to about 10% by weight, or from about 0.5% to about 6.5% by weight, or any amount therebetween, of the final fertilizer composition. As another example, the polymeric coating may be from about 0.5% to about 4.5% by weight, or any amount therebetween, of the final fertilizer composition. Particular, non-limiting examples of suitable polymeric coating weights include 0.5, 0.7, 1.0, 1.2, 1.4, 1.6, 1.8, 2.0, 2.2, 2.4, 2.6, 2.8, 3.0, 3.1, 4.2, 4.3, 4.5, 6.2, 6.3, 6.5 8.2, 8.3, 10, 15 and 20% by weight based on the weight of the coated fertilizer composition.

A second or additional coating may be present either between the polymer coating and the fertilizer core as an intermediate layer or positioned outside of the polymer coating as an outer layer. In some embodiments, the second or additional coating layer is a distinct layer within the polymer coating. Preferred materials that may be used for the intermediate or outer layer include, but are not limited to, a petroleum product, a wax, a paraffin oil, a bitumen, an asphalt, a lubricant, a coal product, an oil, canola oil, soybean oil, coconut oil, linseed oil, tung oil, vegetable wax, animal fat, animal wax, a forest product, tall oil, modified tall oil, tall oil pitch, pine tar, a synthetic oil, a synthetic wax, a synthetic lubricant, an ethylene-vinyl acetate copolymer, an ethylene-acrylic acid copolymer; an ethylene-ethyl acrylate copolymer, an ethylene-vinyl alcohol copolymer, ethylene-vinyl alcohol-vinyl acetate terpolymers, a surfactant, a soap and a combination thereof. In some embodiments, if the additional layer is an outer layer, the layer is then a water-insoluble layer.

In accordance with this invention, the polymeric coating comprises organic carbonate, such as a cyclic organic carbonate. Examples of organic carbonates include propylene carbonate, ethylene carbonate, glycerol carbonate, butylenes carbonate (e.g., 1,2-butylene carbonate, cis 2,3-butylene carbonate, trans 2,3-butylene carbonate), and phenylethylene carbonate.

The carbonate is present at a level of at least 0.05% by weight of the abrasion-resistance controlled release fertilizer composition, in some embodiments at least 0.1% by weight. Additionally, the carbonate is present at a level of no more than 5% by weight of the abrasion-resistance controlled release fertilizer composition, in some embodiments no more than 2% or 1.5% or 1.2% by weight, and in other embodiments no more than 1.0% by weight. Particular, non-limiting examples of suitable carbonate weights include 0.1, 0.2, 0.3, 0.4, 0.5, 0.6, 0.7, 0.8, 1.0, 1.2, 1.5, 2, 4 and 5% by weight based on the weight of the fertilizer composition.

The carbonate may be present homogeneously throughout the polymeric coating, or may be confined to one or more layers within the coating. The carbonate is present at a level of at least 1% by weight of the polymeric coating, in some embodiments at least 2% by weight. Additionally, the carbonate is present at a level of no more than 25% by weight of the polymeric coating, in some embodiments no more than 20% by weight. In some embodiments, the carbonate is present at a level of between 3 wt-% to 18 wt-%, in other embodiments at a level between 5 wt-% and 16 wt-%, based on the weight of the polymeric coating on the fertilizer core.

For embodiments where the polymeric coating is a polyurethane coating formed by reacting isocyanate and polyol(s), the carbonate may be present in the isocyanate, the polyol, or both. The carbonate is present at a level of at least 5% by weight of the polyol, in some embodiments at least 7% by weight. Additionally, the carbonate is present at a level of no more than 50% by weight of the polyol, in some embodiments no more than 40% by weight of the polyol. In some embodiments, the carbonate is present at a level from 10% by weight to 30% by weight, or from 10% by weight to 20% by weight, or any amount therebetween. Particular, non-limiting examples of suitable carbonate weights include 5, 10, 15, 19, 20, 25 and 30% by weight based on the weight of the polyol(s). Similarly, the carbonate is present at a level of at least 5% by weight of the isocyanate (s), in some embodiments at least 7% by weight. Additionally, the carbonate is present at a level of no more than 50% by weight of the isocyanate, in some embodiments no more than 40% by weight of the isocyanate. In some embodiments, the carbonate is present at a level from 10% by weight to 30% by weight, or from 10% by weight to 20% by weight, or any amount therebetween.

The present invention also provides a method of producing a controlled release fertilizer composition that comprises, coating a plant nutrient compound with two or more than two precursor compounds that react to form a polymer.

The controlled release fertilizer composition may be produced using a rotating drum to produce the polymer layer over and around fertilizer core granules. In this procedure, fertilizer granules, having a size range from about 1 mm to about 3 mm, or any size therebetween, for example about 1.5 mm to about 2 mm or any size therebetween, are fed from a storage area, onto a conveyor and fed into a rotating drum, or a pre-heater. If a drum is used, in a first section of the rotating drum, the fertilizer granules may be preheated to about a temperature between 120° F. and 250° F., or any temperature therebetween, for example from about 150° F. to about 200° F., or about 120, 125, 130, 135, 140, 145, 150, 155, 160, 165, 170, 175, 180, 185, 190, 195, 200, 205, 210, 220, 240, 230, 240, 250° F., or any amount therebetween, for example about 170° F. The heated granules are then coated with precursor compounds to produce the polymer coating. For example if the polymer coating comprises a polyurethane polymer, polymeric MDI (4,4 diphenylmethane diisocyanate), and DEG (diethylene glycol)polyols, optionally mixed with TEA (triethanolamine), are simultaneously or sequentially applied to the fertilizer core granules, and the polymer components polymerize on the surface of the granules to form a polymer coating. The carbonate material can be present in either or both the MDI and polyols prior to addition to the rotating drum.

If desired, a water-insoluble coating may be applied onto the polymer-coated granule through nozzles within a second drum. The water-insoluble layer, for example a wax, may be applied at a temperature of about 120° F. to about 250° F., or any temperature therebetween, for example from about 150° F. to about 200° F., or any amount therebetween, for example about 160° F.

The release rate and durability of the controlled release fertilizer composition may be determined on either the unabraded or the abraded fertilizer composition or coated fertilizer product. For example, to determine the release rate and durability of an abraded fertilizer composition or product, an Impact Test or other test may be used to abrade the composition or product in order to determine the integrity of the abraded coated fertilizer composition or product. The Impact Test may involve dropping, for example, 30 grams of the coated product through a 20 foot long, 3-6 inch diameter tube onto a metal plate, followed by determining the release rate of the fertilizer component from the abraded fertilizer product.

To determine the aqueous release rate of either the unabraded or abraded fertilizer composition or product, about 10-20 grams of the composition to be tested (e.g., an unabraded or abraded (e.g., dropped) fertilizer composition or product) are placed in 150-200 ml of water at selected temperatures (e.g., 20° C. and 30° C.), and water samples are drawn at different time intervals (e.g., 1 day, 3 days, 7 days, 14 days, 21 days, etc.). The water samples are tested for fertilizer content using an appropriate test for the fertilizer material. For example, in the case of a urea-based fertilizer, urea and ammoniacal nitrogen of the sample may be determined using any suitable test, for example, the methods outlined by the Association of Official Analytical Chemists (AOAC). The AOAC also has methods outlined for the determination of potassium (expressed as weight % $K_2O$) for muriate of potash (MOP), the phosphate in phosphate sources, such as monoammonium phosphate (MAP), expressed as weight % $P_2O_5$, the ammonium and nitrogen in ammonium nitrate containing sources (expressed as weight % N). The AOAC also has analytical methods for the determination of micronutrients such as iron (Fe), copper (cu), and zinc (Zn).

Results from such testing demonstrate that the controlled release fertilizer composition of the present invention, comprising a cyclic carbonate in a polymeric coating on the fertilizer core, provide improved abrasion properties, by increased time release of the fertilizer component, when compared to a similar fertilizer composition with no cyclic carbonate.

The controlled released fertilizer composition of the present invention will be illustrated with reference to the following examples.

The following materials were used for the following examples:

| | |
|---|---|
| Aromatic polyester polyol, TERATE ® 258 (from Invista) | |
| Viscosity, cps @25° C. | 2000 min.-4500 max. |
| Acid number, mg KOH/g | 2 max. |
| Hydroxyl value, mg KOH/g | 225 min.-255 max. |
| | (equiv. wt range 220-249) |
| Hydroxyl type | 100% primary |
| % water | 0.2 max. |
| functionality | 2 |
| % aromatic (as phenyl) | 26 |
| Polymeric MDI, M 20 S (from BASF) | |
| Viscosity, cps @25° C. | 200 |
| Acidity | 0.05 |
| NCO content, % | 31.8 |
| Equivalent weight, g/equiv. | 132 |
| Density, g/cm$^3$ | 1.23 |
| Triethanol Amine (TEA); catalyst/cross linker | |
| Equivalent weight, g/equiv. | 49.7 |
| Propylene Carbonate (Huntsman) | |
| Ethylene Carbonate (Huntsman) | |
| Wax; C30+ HA alpha-olefin wax (CP Chemical) | |
| Green Pigment (Sun Chemical) | |
| Compacted Potassium Chloride (muriate of potash; MOP) (U.S. standard sieves −5 + 10) | |
| Drum Granulated monoammonium phosphate (MAP) (Agrium Inc.) | |
| Fluid Bed Granulated urea (Qafco) | |
| Drum Granulated 21-7-14 (Yara) | |
| Pan Granulated MOP (Agrium Advanced Technologies (U.S.) Inc.) | |
| Quadrol polyol/polyurethane catalyst (BASF) | |
| Soybean oil derived polyol, BIOH ® X0210 (Cargill) | |
| Viscosity, cps @25° C. | 8,900 |
| Acid number, mg KOH/g | 1.7 |
| Hydroxyl value, mg KOH/g | 225 (equiv. wt = 249) |
| Hydroxyl type | 100% secondary |
| % water | 0.3 |
| functionality | 4.87 |

Comparative Example 1

A polyol blend composed of 88.0 wt-% polyester polyol, 10.0 wt-% TEA and 2.0 wt-% green pigment was prepared.

1500 grams of ambient temperature MOP was charged in a small rotating drum coater (rotating at 18 rpm) at ambient temperature. The MOP was heated to 80° C. and maintained at that temperature for the duration of the coating process. The MDI and polyol blend were injected into the tumbling bed as follows:
(1) 3.25 grams of MDI were injected into the tumbling bed and allowed to spread over the granules for 45 seconds;
(2) 7.30 grams of polyol blend were injected into the tumbling bed and allowed to spread over the granules for 90 seconds;
(3) 4.87 grams of MDI were injected in the tumbling bed and allowed to spread over the granules for 105 seconds.
This injection sequence constituted one reactive layer, and took 240 seconds to complete.

Three additional reactive layers were injected into the tumbling bed of hot granules using the same timing sequence, except that in layer 4, an injection of 6.25 grams of wax was made 75 seconds after the last MDI injection, and the wax was allowed to spread for the 30 seconds that remained in layer 4. At the conclusion of the fourth layer (960 seconds), the heat was turned off and the tumbling bed of granules was cooled to ambient temperature.

The total coating applied (grams of polyurethane+grams of wax) was 67.92 grams. The coating was 4.3 wt-% of the total product (100*67.92/(67.92+1500)).

Comparative Example 2

Comparative Example 2 was prepared by the same procedure as Comparative Example 1, except that two additional and subsequent reactive layers were applied and, for each of the six reactive layers, the first MDI injection was 3.32 grams, the polyol blend injection was 7.46 grams, and the second MDI injection was 4.97 grams.

The total coating applied (grams of polyurethane+grams of wax) was 100.75 grams. The coating was 6.3 wt-% of the total product (100*100.75/(100.75+1500)).

Comparative Example 3

Comparative Example 3 was prepared by the same procedure as Comparative Example 2, except that two additional and subsequent reactive layers were applied and, for each of the eight reactive layers, the first MDI injection was 3.25 grams, the polyol blend injection was 7.30 grams, and the second MDI injection was 4.87 grams. Also, in addition to the 6.25 grams of wax injected in the fourth reactive layer, 6.25 grams of wax were injected in the seventh reactive layer.

The total coating applied (grams of polyurethane+grams of wax) was 135.83 grams. The coating was 8.3 wt-% of the total product (100*135.83/(135.83+1500)).

Comparative Example 4

Comparative Example 4 was prepared the same as Comparative Example 2, except Drum Granulated monoammonium phosphate (MAP, available from Agrium Inc.) was used in place of compact granulated MOP.

Comparative Example 5

Comparative Example 5 was prepared the same as Comparative Example 2, except Fluid Bed Granulated urea (available from Qafco) was used in place of compact granulated MOP.

Comparative Example 6

Comparative Example 6 was prepared the same as Comparative Example 2, except Drum Granulated 21-7-14 (available from Yara) was used in place of compact granulated MOP.

Comparative Example 7

Comparative Example 7 was prepared the same as Comparative Example 2, except Pan Granulated MOP (available from Agrium Advanced Technologies (U.S.) Inc.) was used in place of compact granulated MOP.

Comparative Example 8

A polyol blend composed of 91.20% BIOH X0210 soybean oil based polyol, 5.00% wax, and 3.80% Quadrol was prepared.

1000 grams of ambient temperature urea (available from Qafco) was charged in a small rotating drum coater (rotating at 18 rpm) at ambient temperature. The urea was heated to 65° C. and maintained at that temperature for the duration of the coating process. The coating process was carried out as follows:

(1) 0.99 grams of TEA were injected into the tumbling bed of urea and allowed to spread over the bed for 1 minute.
(2) 1.49 grams of MDI were then injected into the tumbling bed of urea and allowed to spread over the granules for four minutes.
(3) 5.07 grams of the polyol blend and 4.05 grams of MDI were then injected simultaneously into the tumbling bed of urea and allowed to spread over the granules for 5 minutes.
(4) Step (3) was repeated twice more At the conclusion of the last set of injections, the heat was turned off and the tumbling bed of granules was allowed to cool to ambient temperature.

The total coating applied (grams of polyurethane+grams of wax) was 29.84 grams. The coating was 2.9% of the total product (100*29.84/(29.84+1000)).

Example 1

A polyol blend composed of 79.2 wt-% polyester polyol, 9.0 wt-%, TEA 1.8 wt-% green pigment, and 10.0 wt-% propylene carbonate was prepared.

Example 1 was prepared by the same procedure as Comparative Example 1, except that the first MDI injection was 3.25 grams, the polyol blend injection was 8.12 grams, and the second MDI injection was 4.87 grams.

The total coating applied (grams of polyurethane+grams of wax) was 67.92 grams. The total carbonate applied was 3.25 grams (4*(0.1*8.12)). The coating was 4.3 wt-% of the total product and the carbonate was 0.2 wt-% of the total product.

Example 2

Example 2 was prepared by the same procedure as Example 1, except that two additional and subsequent reactive layers were applied and, for each of the six reactive layers, the first MDI injection was 3.25 grams, the polyol blend injection was 8.12 grams, and the second MDI injection was 4.87 grams.

The total coating applied (grams of polyurethane+grams of wax) was 98.82 grams. The total carbonate applied was 4.87 grams (6*(0.1*8.12)). The coating was 6.2 wt-% of the total product and the carbonate was 0.3 wt-% of the total product.

Example 3

Example 3 was prepared by the same procedure as Example 1, except that the polyol blend was composed of 71.3 wt-% polyester polyol, 8.1 wt-% TEA, 1.6 wt-% green pigment, and 19.0 wt-% propylene carbonate. The first MDI injection was 3.25 grams, the polyol blend injection was 9.02 grams, and the second MDI injection was 4.87 grams. The wax injection in the fourth reactive layer was 6.27 grams.

The total coating applied (grams of polyurethane+grams of wax) was 67.97 grams. The total carbonate applied was 6.86 grams (4*(0.19*9.02)). The coating was 4.3 wt-% of the total product and the carbonate was 0.4 wt-% of the total product.

Example 4

Example 4 was prepared by the same procedure as Example 3, except that two additional and subsequent reactive layers were applied and, for each of the six reactive layers, the first MDI injection was 3.30 grams, the polyol blend injection was 9.19 grams, and the second MDI injection was 4.95 grams. The wax injection in the fourth reactive layer was 6.37 grams.

The total coating applied (grams of polyurethane+grams of wax) was 100.53 grams. The total carbonate applied was 10.48 grams (6*(0.19*9.19)). The coating was 6.2 wt-% of the total product and the carbonate was 0.7 wt-% of the total product.

Example 5

Example 5 was prepared by the same procedure as Example 1, except that the polyol blend was composed of 62.4 wt-% polyester polyol, 7.1 wt-% TEA, 1.4 wt-% green pigment, and 29.1 wt-% propylene carbonate. The first MDI injection was 3.25 grams, the polyol blend injection was 10.36 grams, and the second MDI injection was 4.87 grams. The wax injection in the fourth reactive layer was 6.27 grams.

The total coating applied (grams of polyurethane+grams of wax) was 68.13 grams. The total carbonate applied was 12.06 grams (4*(0.291*10.36)). The coating was 4.3 wt-% of the total product and the carbonate was 0.8 wt-% of the total product.

Example 6

Example 6 was prepared by the same procedure as Example 5, except that two additional and subsequent reactive layers were applied and, for each of the six reactive layers, the first MDI injection was 3.30 grams, the polyol blend injection was 10.36 grams, and the second MDI injection was 4.95 grams.

The total coating applied (grams of polyurethane+grams of wax) was 99.94 grams. The total carbonate applied was 18.09 grams (6*(0.291*10.36)). The coating was 6.2 wt-% of the total product and the carbonate was 1.1 wt-% of the total product.

Example 7

Example 7 was prepared by the same procedure as Example 2, except that two additional and subsequent reactive layers were applied and an additional wax injection was made in the seventh reactive layer. For each of the eight reactive layers, the first MDI injection was 3.23 grams, the polyol blend injection was 8.08 grams, and the second MDI injection was 4.85 grams. The wax injection in the fourth and seventh reactive layers was 6.22 grams.

The total coating applied (grams of polyurethane+grams of wax) was 135.26 grams. The total carbonate applied was 6.46 grams (8*(0.10*8.08)). The coating was 8.2 wt-% of the total product and the carbonate was 0.4 wt-% of the total product.

Example 8

Example 8 was prepared by the same procedure as Example 4, except that two additional and subsequent reactive layers were applied and an additional wax injection was made in the seventh reactive layer. For each of the eight reactive layers, the first MDI injection was 3.25 grams, the polyol blend injection was 9.02 grams, and the second MDI injection was 4.87 grams. The wax injection in the fourth and seventh reactive layers was 6.27 grams.

The total coating applied (grams of polyurethane+grams of wax) was 135.95 grams. The total carbonate applied was 13.71 grams (8*(0.19*9.02)). The coating was 8.2 wt-% of the total product and the carbonate was 0.8 wt-% of the total product.

Example 9

Example 9 was prepared the same as Example 4, except Drum Granulated MAP was used in place of compact granulated MOP.

Example 10

Example 10 was prepared the same as Example 4, except Fluid Bed Granulated urea was used in place of compact granulated MOP.

Example 11

Example 11 was prepared the same as Example 4, except Drum Granulated 21-7-14 was used in place of compact granulated MOP.

Example 12

Example 12 was prepared the same as Example 4, except Pan Granulated MOP was used in place of compact granulated MOP.

Example 13

Example 13 was prepared the same as Example 4, except Ethylene Carbonate (EC) was used in place of Propylene Carbonate.

Example 14

Example 14 was prepared the same as Example 4, except that the Propylene Carbonate was carried into the formulation in the Polymeric MDI, instead of in the polyol blend. The final product had the same total coating, and the same wt. % Propylene carbonate as Example 4.

Example 15

A polyol blend composed of 75.95% BIOH X0210 soybean oil based polyol, 4.16% wax, 3.17% Quadrol, and 16.72% propylene carbonate was prepared.

1000 grams of ambient temperature urea (Qafco) was charged in a small rotating drum coater (rotating at 18 rpm) at ambient temperature. The urea was heated to 65° C. and maintained at that temperature for the duration of the coating process. The coating process was carried out as follows:
(1) 0.99 grams of TEA were injected into the tumbling bed of urea and allowed to spread over the bed for 1 minute.
(2) 1.49 grams of MDI were then injected into the tumbling bed of urea and allowed to spread over the granules for four minutes.
(3) 6.06 grams of the polyol blend and 4.08 grams of MDI were then injected simultaneously into the tumbling bed of urea and allowed to spread over the granules for 5 minutes.
(4) Step (3) was repeated twice more At the conclusion of the last set of injections, the heat was turned off and the tumbling bed of granules was allowed to cool to ambient temperature.

The total coating applied (grams of polyurethane+grams of wax) was 29.86 grams. The total propylene carbonate applied was 3.04 grams (3*6.06*0.1672). The coating was 2.9% of the total product, while the propylene carbonate was 0.3% of the total product.

Testing

Examples 1 through 15 and Comparative Examples 1 through 8 were tested for their longevity as determined by the rate of dissolution of the fertilizer before and after being abraded. To measure the effect of abrading the coating, 30 grams of the sample were dropped through a 20 foot long, 4 inch diameter tube onto a metal plate. 10 grams of a sample before abrasion and 10 grams of a sample after abrasion were placed in separate 100 ml containers of water at selected temperatures (i.e., 20° C. and 30° C.). Water samples were drawn at different time intervals (e.g., 1 day, 3 days, 7 days, 14 days, 21 days, etc.) and were tested for fertilizer content by measuring the refractive index of the water above the remaining fertilizer sample, and comparing the measured refractive index to a calibration curve.

Comparative Example 1, Example 1, Example 3 and Example 5

These examples each had a total coating of 4.3 wt-% with a carbonate level of 0 wt-%, 0.2 wt-%, 0.4 wt-% and 0.8 wt-%, respectively. The results from the longevity testing are listed in Tables 1 through 4, below, where "PC" represents propylene carbonate.

TABLE 1

Percentage Release of Fertilizer vs. Days Tested Before "Drop Abrasion" Procedure; at 20° C. water

| Days in test | Comp. Ex. 1 0% PC | Example 1 0.2% PC | Example 3 0.4% PC | Example 5 0.8% PC |
|---|---|---|---|---|
| 1 | 57.8 | 52.7 | 33.8 | 33.9 |
| 7 | 82.3 | 71.4 | 50.2 | 51.2 |
| 14 | | | 53.7 | 56.5 |
| 21 | | | 56.3 | 60.1 |
| 28 | | | 58.1 | 61.9 |
| 35 | | | 59.0 | 64.6 |
| 42 | | | 59.9 | 65.5 |
| 56 | | | 61.7 | 66.4 |
| 63 | | | 62.6 | 67.3 |
| 77 | | | 62.6 | 68.2 |
| 84 | | | 63.5 | 68.2 |
| 91 | | | 64.4 | 69.1 |
| 98 | | | 64.4 | 69.1 |
| 105 | | | 64.4 | 68.2 |
| 119 | | | 67.1 | 70.9 |
| 126 | | | 67.1 | 70.9 |
| 140 | | | 68.0 | 71.8 |

TABLE 2

Percentage Release of Fertilizer vs. Days Tested After "Drop Abrasion" Procedure; at 20° C. water

| Days in test | Comp. Ex. 1 0% PC | Example 1 0.2% PC | Example 3 0.4% PC | Example 5 0.8% PC |
|---|---|---|---|---|
| 1 | 61.4 | 55.3 | 43.2 | 37.3 |
| 7 | 84.1 | 79.7 | 63.5 | 54.7 |
| 14 | | | 71.6 | 62.8 |
| 21 | | | 75.2 | 66.4 |
| 28 | | | 77.1 | 69.1 |
| 35 | | | 79.8 | 72.7 |
| 42 | | | | 73.6 |
| 56 | | | | 76.4 |
| 63 | | | | 77.3 |
| 77 | | | | 78.2 |
| 84 | | | | 78.2 |
| 91 | | | | 79.2 |

TABLE 3

Percentage Release of Fertilizer vs. Days Tested Before "Drop Abrasion" Procedure; at 30° C. water

| Days in test | Comp. Ex. 1 0% PC | Example 1 0.2% PC | Example 3 0.4% PC | Example 5 0.8% PC |
|---|---|---|---|---|
| 1 | 59.6 | 59.7 | 38.9 | 33.9 |
| 7 | 80.4 | 76.0 | 52.8 | 50.3 |
| 14 | | | 57.2 | 56.5 |
| 21 | | | 61.0 | 61.9 |
| 28 | | | 68.9 | 62.8 |
| 35 | | | 67.1 | 65.5 |
| 42 | | | 68.9 | 67.3 |
| 56 | | | 75.2 | 71.8 |
| 63 | | | 77.1 | 71.8 |
| 77 | | | 82.6 | 75.5 |
| 84 | | | | 77.3 |
| 91 | | | | 78.2 |
| 98 | | | | 79.2 |

TABLE 4

Percentage Release of Fertilizer vs. Days Tested After "Drop Abrasion" Procedure; at 30° C. water

| Days in test | Comp. Ex. 1 0% PC | Example 1 0.2% PC | Example 3 0.4% PC | Example 5 0.8% PC |
|---|---|---|---|---|
| 1 | 62.3 | 59.7 | 44.1 | 38.1 |
| 7 | 83.2 | 80.6 | 63.5 | 57.4 |
| 14 | | | 70.7 | 66.4 |
| 21 | | | 74.3 | 71.8 |
| 28 | | | 77.1 | 72.7 |
| 35 | | | 78.0 | 74.6 |
| 42 | | | 79.8 | 76.4 |
| 56 | | | | 80.1 |

Comparative Example 2, Example 2, Example 4 and Example 6

These examples each had a total coating of either 6.2 wt-% or 6.3 wt-% with a carbonate level of 0 wt-%, 0.3 wt-%, 0.7 wt-% and 1.1 wt-%, respectively. The results from the longevity testing are listed in Tables 5 through 8, below, where "PC" represents propylene carbonate.

TABLE 5

Percentage Release of Fertilizer vs. Days Tested Before "Drop Abrasion" Procedure; at 20° C. water

| Days in test | Comp. Ex. 2 0% PC | Example 2 0.3% PC | Example 4 0.7% PC | Example 6 1.1% PC |
|---|---|---|---|---|
| 1 | 13.1 | 16.5 | 8.2 | 4.1 |
| 7 | 30.9 | 29.3 | 19.1 | 10.8 |
| 14 | 38.7 | 36.2 | 26.8 | 12.4 |
| 21 | 43.9 | 39.7 | 31.1 | 15.0 |
| 28 | 46.6 | 41.4 | 32.8 | 16.7 |
| 35 | 50.1 | 44.9 | 34.6 | 17.5 |
| 42 | 51.9 | 44.9 | 36.3 | 19.2 |
| 56 | 54.6 | 46.7 | 38.9 | 20.9 |
| 63 | 55.5 | 47.6 | 38.9 | 20.9 |
| 77 | 57.3 | 48.5 | 39.8 | 22.6 |
| 84 | 58.2 | 48.5 | 40.7 | 23.5 |
| 91 | 58.2 | 49.4 | 41.6 | 23.5 |
| 98 | 59.1 | 50.3 | 41.6 | 24.3 |
| 105 | 59.1 | 49.4 | 41.6 | 24.3 |
| 119 | 60.9 | 52.1 | 43.3 | 26.0 |
| 126 | 61.8 | 52.1 | 44.2 | 26.9 |
| 140 | 62.7 | 53.0 | 45.1 | 28.6 |

TABLE 6

Percentage Release of Fertilizer vs. Days Tested After "Drop Abrasion" Procedure; at 20° C. water

| Days in test | Comp. Ex. 2 0% PC | Example 2 0.3% PC | Example 4 0.7% PC | Example 6 1.1% PC |
|---|---|---|---|---|
| 1 | 19.8 | 17.4 | 8.2 | 7.4 |
| 7 | 37.8 | 36.2 | 20.8 | 15.8 |
| 14 | 49.2 | 48.7 | 32.0 | 23.5 |
| 21 | 58.2 | 52.1 | 37.2 | 27.8 |
| 28 | 60.9 | 54.7 | 39.8 | 31.2 |
| 35 | 62.7 | 58.4 | 42.4 | 34.7 |
| 42 | 64.5 | 59.3 | 45.1 | 36.5 |
| 56 | 67.3 | 62.9 | 50.4 | 40.9 |
| 63 | 68.2 | 63.8 | 51.3 | 40.9 |
| 77 | 70.0 | 64.7 | 53.1 | 43.5 |
| 84 | 71.9 | 65.6 | 54.9 | 45.3 |
| 91 | 72.8 | 66.6 | 54.9 | 45.3 |
| 98 | 74.6 | 66.6 | 55.8 | 45.3 |
| 105 | 74.6 | 66.6 | 55.8 | 45.3 |
| 119 | 78.4 | 68.4 | 58.6 | 48.0 |
| 126 | 79.3 | 69.3 | 58.6 | 48.0 |
| 140 | | 70.2 | 59.5 | 49.8 |

TABLE 7

Percentage Release of Fertilizer vs. Days Tested Before "Drop Abrasion" Procedure; at 30° C. water

| Days in test | Comp. Ex. 2 0% PC | Example 2 0.3% PC | Example 4 0.7% PC | Example 6 1.1% PC |
|---|---|---|---|---|
| 1 | 15.6 | 11.5 | 4.1 | 3.3 |
| 7 | 31.7 | 25.0 | 14.9 | 7.4 |
| 14 | 38.7 | 31.8 | 20.0 | 10.8 |
| 21 | 43.9 | 37.0 | 23.4 | 14.1 |
| 28 | 46.6 | 40.5 | 26.8 | 17.5 |
| 35 | 51.0 | 43.2 | 29.4 | 19.2 |
| 42 | 53.7 | 44.9 | 32.0 | 21.8 |
| 56 | 57.3 | 49.4 | 35.4 | 26.0 |
| 63 | 59.1 | 50.3 | 38.0 | 28.6 |
| 77 | 62.7 | 53.0 | 41.6 | 32.1 |
| 84 | 64.5 | 53.8 | 44.2 | 33.8 |
| 91 | 66.4 | 54.7 | 46.0 | 35.6 |
| 98 | 68.2 | 55.6 | 48.7 | 37.3 |
| 105 | 69.1 | 55.6 | 49.5 | 38.2 |
| 119 | 73.7 | 59.3 | 54.9 | 41.7 |
| 126 | 75.6 | 60.2 | 55.8 | 42.6 |
| 140 | 79.3 | 62.0 | 59.5 | 45.3 |

TABLE 8

Percentage Release of Fertilizer vs. Days Tested After "Drop Abrasion" Procedure; at 30° C. water

| Days in test | Comp. Ex. 2 0% PC | Example 2 0.3% PC | Example 4 0.7% PC | Example 6 1.1% PC |
|---|---|---|---|---|
| 1 | 16.5 | 16.5 | 9.9 | 6.6 |
| 7 | 37.8 | 37.0 | 25.1 | 17.5 |
| 14 | 51.0 | 47.6 | 34.6 | 26.9 |
| 21 | 58.2 | 53.0 | 39.8 | 33.0 |
| 28 | 61.8 | 56.5 | 43.3 | 37.3 |
| 35 | 65.4 | 59.3 | 46.0 | 40.9 |
| 42 | 68.2 | 61.1 | 48.7 | 43.5 |
| 56 | 73.7 | 66.6 | 54.0 | 48.0 |
| 63 | 74.6 | 66.6 | 54.0 | 49.8 |
| 77 | 78.4 | 68.4 | 57.6 | 53.4 |
| 84 | 80.2 | 69.3 | 58.6 | 54.3 |
| 91 | | 70.2 | 60.4 | 55.2 |
| 98 | | 71.2 | 61.3 | 57.0 |
| 105 | | 71.2 | 61.3 | 57.0 |
| 119 | | 75.8 | 64.9 | 60.6 |
| 126 | | 75.8 | 65.9 | 62.5 |
| 140 | | 77.7 | 67.7 | 64.3 |

Comparative Example 3, Example 7 and Example 8

These examples each had a total coating of 8.2 wt-% or 8.3 wt-% with a carbonate level of 0 wt-%, 0.4 wt-% and 0.8 wt-%, respectively. The results from the longevity testing are listed in Tables 9 through 12, below, where "PC" represents propylene carbonate.

TABLE 9

Percentage Release of Fertilizer vs. Days Tested Before "Drop Abrasion" Procedure; at 20° C. water

| Days in test | Comp. Ex. 3 0% PC | Example 7 0.4% PC | Example 8 0.8% PC |
|---|---|---|---|
| 1 | 1.7 | 0 | 0.8 |
| 7 | 2.5 | 1.7 | 0.8 |
| 14 | 4.2 | 2.5 | 1.7 |
| 21 | 5.0 | 2.5 | 2.5 |
| 28 | 5.8 | 3.3 | 2.5 |
| 35 | 6.7 | 4.2 | 3.3 |
| 42 | 7.5 | 5.0 | 2.5 |
| 49 | 8.4 | 5.0 | 3.3 |
| 56 | 8.4 | 5.8 | 2.5 |
| 63 | 9.2 | 5.8 | 3.3 |
| 77 | 10.9 | 7.5 | 4.2 |
| 91 | 11.7 | 7.5 | 4.2 |
| 98 | 11.7 | 8.4 | 4.2 |
| 112 | 13.4 | 8.4 | 4.2 |
| 126 | 14.3 | 9.2 | 5.0 |
| 140 | 15.1 | 10.0 | 5.8 |
| 147 | 15.1 | 10.9 | 5.8 |
| 161 | 16.0 | 11.7 | 6.7 |
| 168 | 16.8 | 11.7 | 6.7 |
| 182 | 17.7 | 13.4 | 6.7 |
| 189 | 17.7 | 13.4 | 7.5 |
| 203 | 19.4 | 15.1 | 7.5 |

TABLE 10

Percentage Release of Fertilizer vs. Days Tested After "Drop Abrasion" Procedure; at 20° C. water

| Days in test | Comp. Ex. 3 0% PC | Example 7 0.4% PC | Example 8 0.8% PC |
|---|---|---|---|
| 1 | 2.5 | 1.7 | 1.7 |
| 7 | 11.7 | 9.2 | 6.7 |
| 14 | 19.4 | 10.9 | 8.4 |
| 21 | 24.6 | 14.3 | 11.7 |
| 28 | 28.9 | 16.8 | 15.1 |
| 35 | 32.4 | 20.3 | 16.8 |
| 42 | 35.1 | 22.0 | 19.4 |
| 49 | 36.8 | 23.7 | 21.1 |
| 56 | 38.6 | 25.4 | 22.8 |
| 63 | 40.4 | 27.2 | 24.6 |
| 77 | 43.1 | 28.9 | 26.3 |
| 91 | 44.0 | 29.8 | 28.1 |
| 98 | 44.9 | 30.7 | 28.1 |
| 112 | 45.8 | 31.6 | 29.8 |
| 126 | 46.7 | 32.4 | 30.7 |
| 140 | 47.6 | 33.3 | 31.6 |
| 147 | 48.5 | 33.3 | 32.4 |
| 161 | 49.4 | 35.1 | 33.3 |
| 168 | 48.5 | 34.2 | 33.3 |
| 182 | 50.3 | 36.0 | 34.2 |
| 189 | 50.3 | 36.8 | 35.1 |
| 203 | 51.2 | 37.7 | 35.1 |

TABLE 11

Percentage Release of Fertilizer vs. Days Tested Before "Drop Abrasion" Procedure; at 30° C. water

| Days in test | Comp. Ex. 3 0% PC | Example 7 0.4% PC | Example 8 0.8% PC |
|---|---|---|---|
| 1 | 1.7 | 0 | 0.8 |
| 7 | 3.3 | 1.7 | 0.8 |
| 14 | 4.2 | 2.5 | 1.7 |
| 21 | 5.8 | 3.3 | 1.7 |
| 28 | 8.4 | 4.2 | 2.5 |
| 35 | 9.2 | 5.0 | 2.5 |
| 42 | 10.0 | 6.7 | 2.5 |
| 49 | 10.9 | 7.5 | 3.3 |
| 56 | 12.6 | 8.4 | 3.3 |
| 63 | 14.3 | 10.0 | 4.2 |
| 77 | 16.8 | 12.6 | 5.0 |
| 91 | 18.5 | 15.1 | 6.7 |
| 98 | 19.4 | 16.0 | 7.5 |
| 112 | 22.0 | 18.5 | 9.2 |
| 126 | 23.7 | 21.1 | 11.7 |
| 140 | 25.4 | 22.8 | 13.4 |
| 147 | 26.3 | 24.6 | 15.1 |
| 161 | 28.1 | 26.3 | 16.8 |
| 168 | 29.8 | 28.1 | 17.7 |
| 182 | 30.7 | 30.7 | 20.3 |
| 189 | 31.6 | 32.4 | 20.3 |
| 203 | 33.3 | 35.1 | 22.0 |

TABLE 12

Percentage Release of Fertilizer vs. Days Tested After "Drop Abrasion" Procedure; at 30° C. water

| Days in test | Comp. Ex. 3 0% PC | Example 7 0.4% PC | Example 8 0.8% PC |
|---|---|---|---|
| 1 | 2.5 | 2.5 | 1.7 |
| 7 | 12.6 | 10.0 | 7.5 |
| 14 | 22.0 | 16.0 | 13.4 |
| 21 | 27.2 | 21.1 | 17.7 |
| 28 | 33.3 | 25.4 | 22.0 |
| 35 | 36.8 | 27.2 | 25.4 |
| 42 | 39.5 | 28.9 | 27.2 |
| 49 | 41.3 | 29.8 | 29.8 |
| 56 | 43.1 | 31.6 | 30.7 |
| 63 | 44.9 | 33.3 | 31.6 |
| 77 | 47.6 | 35.1 | 34.2 |
| 91 | 49.4 | 36.8 | 36.0 |
| 98 | 51.2 | 38.6 | 36.8 |
| 112 | 52.1 | 40.4 | 39.5 |
| 126 | 53.9 | 42.2 | 41.3 |
| 140 | 55.8 | 43.1 | 43.1 |
| 147 | 56.7 | 44.0 | 44.0 |
| 161 | 58.5 | 45.8 | 45.8 |
| 168 | 58.5 | 45.8 | 45.8 |
| 182 | 61.3 | 48.5 | 48.5 |
| 189 | 62.2 | 48.5 | 48.5 |
| 203 | 63.1 | 50.3 | 50.3 |

Comparative Example 4 and Example 9

These examples each had a total coating of 6.3 wt-% and 6.2 wt-%, respectively with a carbonate level of 0 wt-% and 0.7 wt-%. The results from the longevity testing are listed in Table 13, below, where "PC" represents propylene carbonate.

TABLE 13

Percentage Release of Fertilizer vs. Days tested After "Drop Abrasion" Procedure, at 20° C. water

| Days in Test | Comp. Ex. 4 0% PC | Example 9 0.7% PC |
|---|---|---|
| 1 | 9.6 | 3.8 |
| 7 | 33.3 | 19.5 |
| 14 | 43.5 | 27.5 |
| 21 | 45.6 | 30.5 |
| 28 | 48.7 | 33.5 |
| 35 | 49.7 | 35.6 |
| 42 | 51.8 | 38.6 |
| 56 | 54.9 | 40.7 |
| 63 | 54.9 | 42.7 |

Comparative Example 5 and Example 10

These examples each had a total coating of 6.3 wt-% and 6.2 wt-%, respectively with a carbonate level of 0 wt-% and 0.7 wt-%. The results from the longevity testing are listed in Table 14, below, where "PC" represents propylene carbonate.

TABLE 14

Percentage Release of Fertilizer vs. Days tested After "Drop Abrasion" Procedure, at 20° C. water

| Days in Test | Comp. Ex. 5 0% PC | Example 10 0.7% PC |
|---|---|---|
| 1 | 7.4 | 5.2 |
| 7 | 11.2 | 6.0 |
| 14 | 13.4 | 8.2 |
| 21 | 14.2 | 9.0 |
| 28 | 15.7 | 9.7 |
| 35 | 17.2 | 10.5 |
| 42 | 18.7 | 12.0 |
| 56 | 21.0 | 14.3 |
| 63 | 22.6 | 15.8 |

Comparative Example 6 and Example 11

These examples each had a total coating of 6.3 wt-% and 6.2 wt-%, respectively with a carbonate level of 0 wt-% and 0.7 wt-%. The results from the longevity testing are listed in Table 15, below, where "PC" represents propylene carbonate.

TABLE 15

Percentage Release of Fertilizer vs. Days tested After "Drop Abrasion" Procedure, at 20° C. water

| Days in Test | Comp. Ex. 6 0% PC | Example 11 0.7% PC |
|---|---|---|
| 1 | 5.5 | 3.7 |
| 7 | 23.2 | 19.5 |
| 14 | 35.6 | 30.0 |
| 21 | 40.5 | 34.9 |
| 28 | 44.4 | 38.8 |
| 35 | 47.3 | 41.7 |
| 42 | 50.3 | 43.7 |
| 56 | 53.3 | 47.7 |
| 63 | 55.3 | 48.7 |

Comparative Example 7 and Example 12

These examples each had a total coating of 6.3 wt-% and 6.2 wt-%, respectively with a carbonate level of 0 wt-% and 0.7 wt-%. The results from the longevity testing are listed in Table 16, below, where "PC" represents propylene carbonate.

TABLE 16

Percentage Release of Fertilizer vs. Days tested After "Drop Abrasion" Procedure, at 20° C. water

| Days in Test | Comp. Ex. 7 0% PC | Example 12 0.7% PC |
|---|---|---|
| 1 | 8.2 | 4.9 |
| 7 | 21.5 | 15.7 |
| 14 | 28.3 | 20.8 |
| 21 | 30.9 | 24.2 |
| 28 | 34.3 | 27.6 |
| 35 | 36.1 | 30.2 |
| 42 | 40.4 | 33.7 |

Comparative Example 2 and Example 13

These examples each had a total coating of 6.3 wt-% and 6.2 wt-%, respectively with a carbonate level of 0 wt-% and 0.7 wt-%. The results from the longevity testing are listed in Table 17, below, where "EC" represents ethylene carbonate.

TABLE 17

Percentage Release of Fertilizer vs. Days tested After "Drop Abrasion" Procedure, at 20° C. water

| Days in Test | Comp. Ex. 2 0% PC | Example 13 0.7% EC |
|---|---|---|
| 1 | 13.1 | 6.6 |
| 7 | 30.9 | 19.1 |
| 14 | 38.7 | 24.2 |
| 21 | 43.9 | 29.4 |
| 28 | 46.6 | 32.8 |
| 35 | 50.1 | 34.5 |
| 42 | 51.9 | 37.2 |
| 56 | 54.6 | 39.8 |
| 63 | 55.5 | 41.5 |

Comparative Example 2 and Example 14

These examples each had a total coating of 6.3 wt-% and 6.2 wt-%, respectively with a carbonate level of 0 wt-% and 0.7 wt-%. The results from the longevity testing are listed in Table 18, below, where "PC" represents propylene carbonate.

TABLE 18

Percentage Release of Fertilizer vs. Days tested After "Drop Abrasion" Procedure, at 30° C. water

| Days in Test | Comp. Ex. 2 0% PC | Example 14 0.7% PC |
|---|---|---|
| 1 | 16.5 | 14.9 |
| 7 | 37.8 | 35.4 |
| 14 | 51.0 | 52.2 |
| 21 | 58.2 | 55.8 |
| 28 | 61.8 | 60.4 |
| 35 | 65.4 | 63.1 |
| 42 | 68.2 | 67.7 |

Comparative Example 8 and Example 15

These examples each had a total coating of 2.93 wt-% and 2.92 wt-%, respectively with a carbonate level of 0 wt-% and 0.3 wt-%. The results from the longevity testing are listed in Table 19, below, where "PC" represents propylene carbonate.

TABLE 19

Percentage Release of Fertilizer vs. Days tested Before "Drop Abrasion" Procedure, at 20° C. water

| Days in Test | Comp. Ex. 8 0% PC | Example 15 0.3% PC |
|---|---|---|
| 1 | 4.3 | 2.1 |
| 7 | 7.9 | 4.3 |
| 14 | 11.5 | 7.9 |
| 21 | 16.6 | 13.0 |
| 29 | 21.8 | 17.4 |
| 35 | 25.5 | 21.8 |
| 42 | 29.2 | 25.6 |
| 49 | 33.8 | 30.1 |
| 56 | 37.6 | 34.6 |

It is clear from the release data shown in Tables 1 through 19 that the inclusion of small amounts of cyclic aromatic carbonate in the polymer coating of irregularly shaped and/or irregularly surfaced fertilizer particles provides increased longevity as compared to the polymer-only coating fertilizer particles.

Thus, various embodiments of the FERTILIZER GRANULES HAVING POLYMERIC COATING WITH ORGANIC CARBONATE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A controlled release fertilizer composition comprising a plant nutrient core coated with a polymeric coating comprising a cyclic organic carbonate at a level of at least 0.05 wt-% to no more than 5 wt-% of the fertilizer composition, wherein an unabraded controlled release fertilizer composition has a release in water of no more than 90% after 3 days at 40° C. (104° F.).

2. The controlled release fertilizer composition of claim 1 wherein the cyclic organic carbonate is present at a level of at least 0.05 wt-% to no more than 4 wt-% of the fertilizer composition.

3. The controlled release fertilizer composition of claim 1 wherein the cyclic organic carbonate is present at a level of at least 0.05 wt-% to no more than 2 wt-% of the fertilizer composition.

4. The controlled release fertilizer composition of claim 1 wherein the cyclic organic carbonate is present at a level of at least 0.1 wt-% to no more than 25 wt-% of the polymeric coating.

5. The controlled release fertilizer composition of claim 1 wherein the cyclic organic carbonate is present at a level of at least 0.1 wt-% to no more than 20 wt-% of the polymeric coating.

6. The controlled release fertilizer composition of claim 1 wherein the cyclic organic carbonate is present at a level of between 3 wt-% and 18 wt-% of the polymeric coating.

7. The controlled release fertilizer composition of claim 1 wherein the cyclic organic carbonate is present at a level of between 5 wt-% and 16 wt-% of the polymeric coating.

8. The controlled release fertilizer composition of claim 1 wherein the plant nutrient core comprises urea.

9. The controlled release fertilizer composition of claim 1 wherein the cyclic organic carbonate comprises at least one compound selected from the group consisting of propylene carbonate, ethylene carbonate, glycerol carbonate, 1,2-butylene carbonate, cis 2,3-butylene carbonate, trans 2,3-butylene carbonate, and phenylethylene carbonate.

10. The controlled release fertilizer composition of claim 1 wherein the polymeric coating is a reaction product of a polyol and an isocyanate.

11. The controlled release fertilizer composition of claim 10 wherein the polyol is a polyester polyol or a polyether polyol.

12. The controlled release fertilizer composition of claim 10 wherein the polyol comprises castor oil.

13. The controlled release fertilizer composition of claim 10 wherein the polyol comprises vegetable oil or nut oil that has been modified to contain isocyanate reactive hydroxyl or amine groups.

14. The controlled release fertilizer composition of claim 13 wherein the vegetable oil is soybean oil, canola oil, linseed oil, or sunflower oil.

15. The controlled release fertilizer composition of claim 13 wherein the nut oil is tung oil.

16. The controlled release fertilizer composition of claim 10 wherein the cyclic organic carbonate is present in the polyol.

17. The controlled release fertilizer composition of claim 10 wherein the cyclic organic carbonate is present in the isocyanate.

18. The controlled release fertilizer composition of claim 10 wherein the cyclic organic carbonate is present in both the polyol and the isocyanate.

19. The controlled release fertilizer composition of claim 1 further comprising an optional wax layer.

20. A process of producing a controlled release fertilizer composition comprising the steps of:
    contacting a particulate plant nutrient with a mixture comprising cyclic organic carbonate, an isocyanate, and a polyol to provide a coated particulate plant nutrient, wherein the cyclic organic carbonate is at a level of at least 5 wt-% to no more than 50 wt-% of the isocyanate; and
    curing the coated particulate plant nutrient to provide the controlled release fertilizer.

21. The process of claim 20 wherein the cyclic organic carbonate is at a level of at least 5 wt-% to no more than 40 wt-% of the isocyanate.

22. A process of using a controlled release fertilizer composition comprising:
    providing a controlled release fertilizer having a plant nutrient core coated with a polymeric coating comprising a cyclic organic carbonate;
    applying the controlled release fertilizer to a surface, or incorporating the controlled release fertilizer into a growing medium;
    exposing the applied or incorporated fertilizer to moisture; and
    releasing no more than 90% of the applied controlled release fertilizer in 3 days at 40° C. (104° F.).

* * * * *